United States Patent [19]

Casull et al.

[11] 4,096,832
[45] Jun. 27, 1978

[54] IGNITION APPARATUS AND METHOD FOR AN INTERNAL COMBUSTION ENGINE

[76] Inventors: Don C. Casull, 2459 Cardinal Way, Salt Lake City, Utah 84117; James M. Dalton, 253 Elm St., Salt Lake City, Utah 84107; Calvin W. Jackson, 2970 E. 4310 South, Salt Lake City, Utah 84117; Amos R. Jackson, 2887 McClelland St., Salt Lake City, Utah 84106

[21] Appl. No.: 717,970

[22] Filed: Aug. 26, 1976

[51] Int. Cl.² .............................................. F02B 19/10
[52] U.S. Cl. .............................. 123/32 SP; 123/32 SJ; 123/41.32; 123/143 B; 123/169 PA
[58] Field of Search ............. 123/32 SP, 32 ST, 75 B, 123/143 B, 169 PA, 191 S, 191 SP, 32 SJ, 41.32

[56] References Cited

U.S. PATENT DOCUMENTS

| | | | |
|---|---|---|---|
| 1,181,122 | 5/1916 | Eastman | 123/32 SP |
| 1,539,133 | 5/1925 | Markle et al. | 123/41.32 |
| 2,032,986 | 3/1936 | Howell et al. | 123/32 ST |
| 2,723,653 | 11/1955 | Blake et al. | 123/191 SP |
| 3,066,662 | 12/1962 | May et al. | 123/143 B |
| 3,102,521 | 9/1963 | Slemmons | 123/32 SP |
| 3,809,039 | 5/1974 | Alquist | 123/32 ST |
| 3,908,625 | 9/1975 | Romy | 123/32 SP |
| 3,926,169 | 12/1975 | Leshner et al. | 123/32 SP |

FOREIGN PATENT DOCUMENTS

| | | | |
|---|---|---|---|
| 2,517,470 | 10/1976 | Germany | 123/32 SP |
| 6,641 | 3/1969 | Japan | 123/32 SP |
| 39,167 | 11/1971 | Japan | 123/191 S |

*Primary Examiner*—Ronald H. Lazarus
*Assistant Examiner*—Andrew M. Dolinar
*Attorney, Agent, or Firm*—H. Ross Workman; J. Winslow Young

[57] ABSTRACT

An improved ignition device wherein a spark plug is provided with a torch chamber surrounding the spark gap. A first mixture of fuel-rich fuel and air is supplied to the torch chamber where it is ignited by a spark and propelled as a jet of burning fuel into the combustion zone of a cylinder of an internal combustion engine. The burning fuel from the torch chamber provides suitable ignition of a relatively lean second mixture of fuel and air in the combustion chamber which mixture is leaner than would otherwise be suitably ignited with a spark from a conventional spark plug. A porous plug in the fuel line acts as a one-way valve by allowing liquid fuel to pass by capillary and/or seepage action while resisting backflow caused by periodic high pressures within the combustion chamber. A cooling and heat-shielding system protects the fuel supply system against excessive heat absorption which would tend to prematurely vaporize the fuel and interfere with the valving apparatus.

14 Claims, 5 Drawing Figures

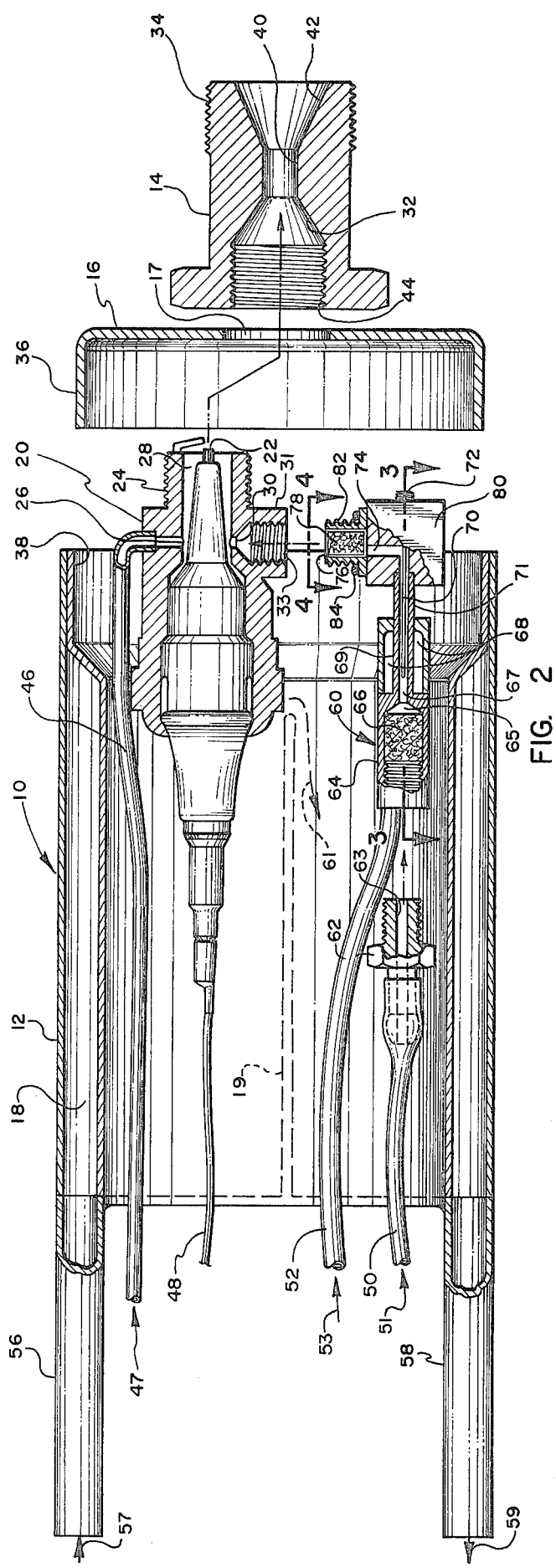
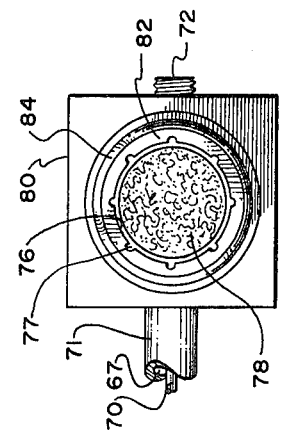
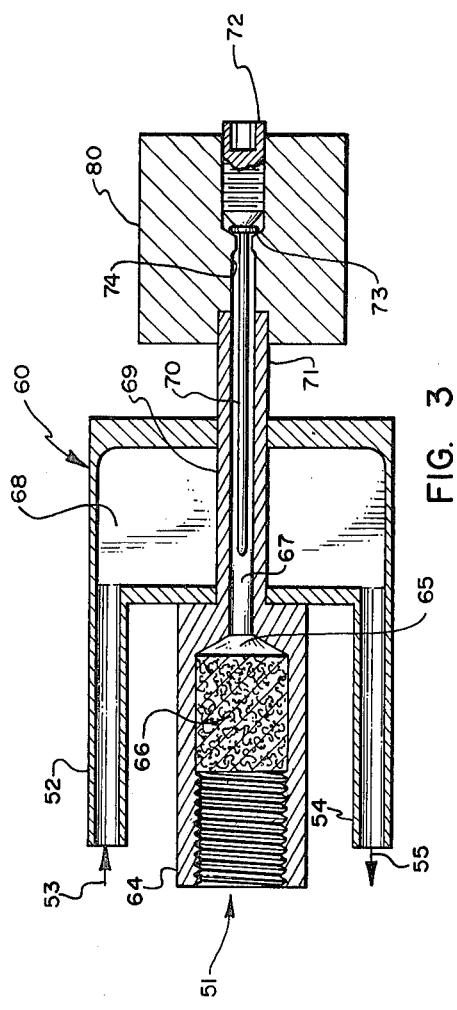
FIG. 2
FIG. 3
FIG. 4

IGNITION APPARATUS AND METHOD FOR AN INTERNAL COMBUSTION ENGINE

BACKGROUND

1. Field of the Invention

This invention relates to a torch plug ignition apparatus and method for an internal combustion engine.

2. The Prior Art

The conventional internal combustion engine utilizes an electrical spark plug as an ignition source for the fuel/air mixture compressed in each cylinder of the engine. The relatively low ignition efficiency of a conventional spark plug requires a relatively rich fuel/air mixture in order to sustain ignition. Accordingly, it is customary to provide an excess of fuel or an approximate fuel-to-air ratio of about 1:8 (1 part vaporized fuel to 8 parts air). However, this fuel/air ratio is substantially in excess of an optimum fuel/air ratio for the appropriate combustion and expansion of the combustion products in the cylinder. It is currently believed that an optimum fuel/air ratio may be as low as 1:40-50.

In recognition of this feature, recent developments in internal combustion engines and, more particularly, the carburetion therefor, has led to the development of what is referred to in the art as the "stratified charge" system. The stratified charge system involves providing a layer or strata of richer fuel/air mixture in the vicinity of the spark plug with the fuel/air mixture becoming progressively leaner further away from the spark plug. Spark ignition is initiated in the adjacent, richer mixture where its ignition provides a flame as the basis for igniting the remaining leaner mixture in the cylinder. Accordingly, the stratified charge more efficiently ignites the remaining, lean fuel/air mixture. This technique provides certain economies in fuel consumption but requires that the carburetion system and the engine be specifically designed to produce a stratified charge and thereby does not readily lend itself to incorporation into existing internal combustion engines through either simple modification or retrofit procedures.

It would, therefore, be an improvement in the art to provide a torch ignition device which can be inserted into the existing spark plug opening. The torch ignition system should propel a torch of flame which will ignite a lean fuel/air mixture, the lean fuel/air mixture being substantially leaner than can be suitably ignited by a conventional spark plug.

An even still further advancement in the art would be to provide an ignition system for an internal combustion engine wherein certain physical laws in a preselected order are advantageously utilized to obviate the use of mechanical means for introducing fuel into the torch chamber of the ignition system. Such an invention is disclosed and claimed herein.

BRIEF SUMMARY AND OBJECTS OF THE INVENTION

The present invention relates to an apparatus and method for propelling a jet of burning fuel into the combustion chamber of a cylinder of an internal combustion engine. The jet of burning fuel is ignited by a spark in a torch chamber and propelled through a torch nozzle into the combustion chamber. The torch nozzle includes a constricted orifice or venturi section which shapes the flame from the torch chamber. A porous plug is interposed in the fuel supply line to the torch chamber to resist the immediate reverse flow action from combustion pressures and thereby create the appropriate unidirectional valving action for the fuel. The fuel is vaporized downstream of the porous plug and the pressure developed thereby used to force the fuel vapor into the torch chamber of the ignition apparatus. Cooling and shielding means are provided for the fuel supply apparatus to inhibit the premature vaporization of fuel.

It is, therefore, a primary object of this invention to provide improvements in ignition apparatus for an internal combustion engine.

Another object of this invention is to provide an improved method for igniting a lean fuel/air mixture in a cylinder of an internal combustion engine.

Another object of this invention is to provide an improved ignition system whereby an ignition flame is injected into the cylinder of an internal combustion engine to serve as the ignition source in place of the conventional spark plug.

Another object of this invention is to provide a unidirectional valving means for introducing fuel into a torch chamber of the ignition system whereby the valving action is achieved in the absence of mechanical valving structure.

An even still further object of this invention is to provide a cooling and shielding means for the fuel supply line to the ignition apparatus to inhibit the premature vaporization of the fuel.

These and other objects and features of the present invention will become more fully apparent from the following description and appended claims taken in conjunction with the accompanying drawing.

BRIEF DESCRIPTION OF THE DRAWING

FIG. 2 is an exploded side elevation of the invention of FIG. 1 with portions broken away to reveal internal components;

FIG. 3 is an enlarged, cross section taken along lines 3—3 of FIG. 2;

FIG. 4 is an enlarged, partial plan view taken along lines 4—4 of FIG. 2; and

DETAILED DESCRIPTION OF THE PREFERRED EMBODIMENTS

The invention is best understood by reference to the figures wherein like parts are designated with like numerals throughout.

General

The present invention includes a torch nozzle which is adapted to be screwed at one end into a conventional spark plug opening in an engine block of an internal combustion engine. The other end of the torch nozzle is adapted to receive a spark plug and thereby form a torch chamber about the electrodes or spark gap of the spark plug. Means are included for introducing air and vaporized fuel into the torch chamber where they are mixed and the fuel/air mixture ignited by a spark at the spark gap. The pressures resulting from the ignition of the fuel/air in the torch chamber causes the burning fuel to be propelled from the torch chamber as a jet of flame into the cylinder of the internal combustion engine. The flame provides suitable ignition in the cylinder of a second fuel/air mixture having a significantly reduced fuel content thereby adapting the internal combustion engine for a surpisingly reduced fuel consumption.

Fuel for the torch chamber is supplied through a separate fuel line and is forced through a porous plug interposed in the fuel line. The porous plug acts as a solid state, one-way valve mechanism to assure unidirectional fuel flow toward the torch chamber. The porous plug allows liquid fuel to seep therethrough at a rate generally proportional to the pressure exerted on the fuel. The porous plug resists cyclic reverse flow of fuel and fuel vapor under the elevated back pressures from the combustion sequence. The minute capillary-like passages in the porous plug through which the fuel seeps thereby impose a damping effect on the cyclic elevated fuel vapor back pressures without significantly interfering with the flow of fuel therethrough.

Since the torch ignition apparatus of this invention operates in a high temperature environment resulting from the combustion of fuel in both the torch chamber and the internal combustion engine, various shielding and cooling modifications are included in the apparatus to inhibit vapor lock from premature vaporization of the fuel upstream of the porous plug. Once the fuel has passed through the porous plug, means are included for conducting a portion of the resultant heat into the fuel and vaporizing the same. The pressure developed by the vaporized fuel diffuses the fuel vapor into the torch chamber where it is mixed with air and subjected to cyclic ignition from the spark plug.

Figure 1:
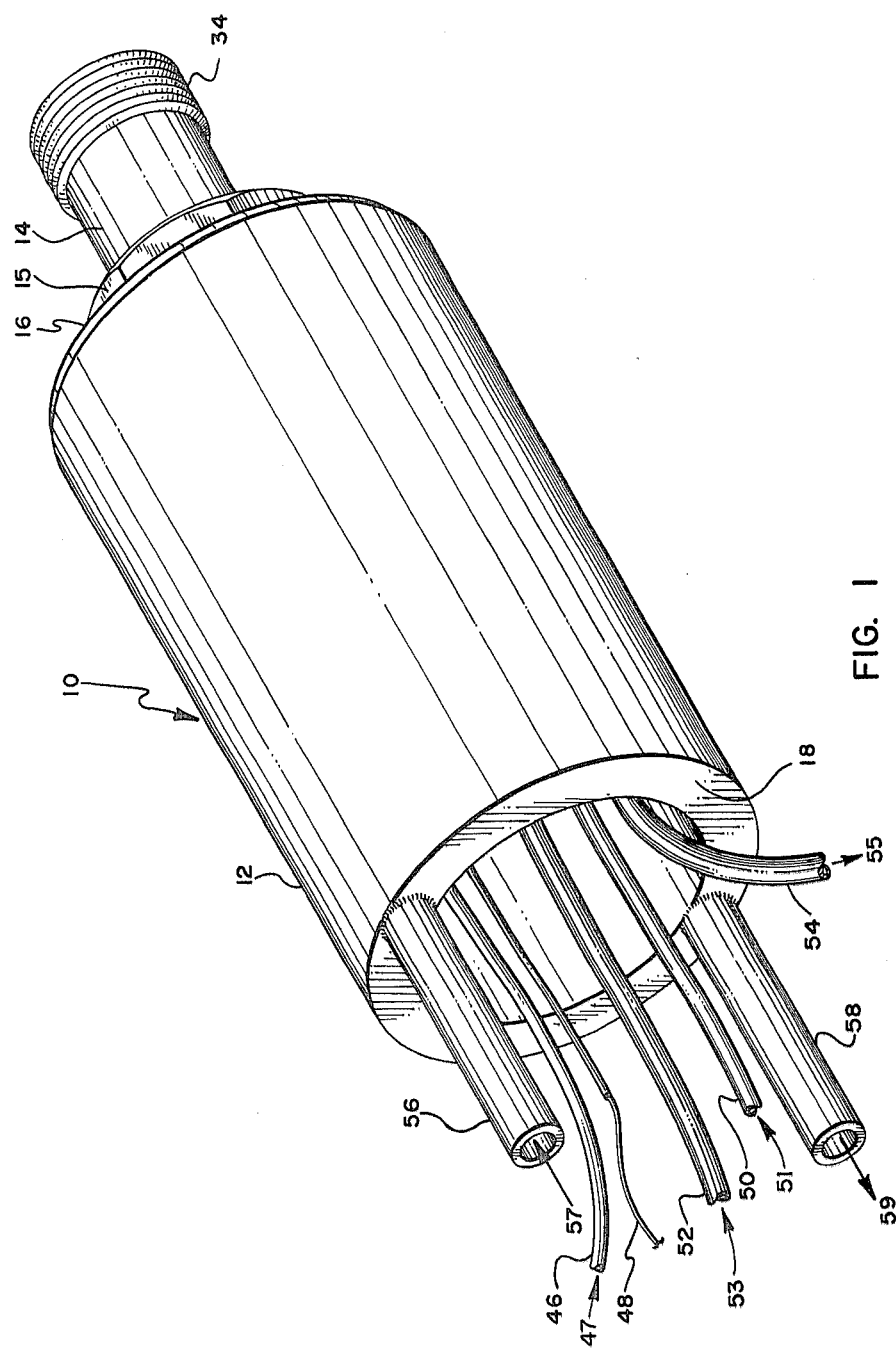
FIG. 1 is a perspective view of one presently preferred embodiment of the heat shield and torch chamber apparatus of this invention.

Referring now more particularly to FIGS. 1 and 2, one presently preferred embodiment of the apparatus of this invention is shown as a torch nozzle 14 which is adapted to receive at threads 44 the threads 24 of a suitably modified spark plug 20 and thereby enclose a spark gap 22 of spark plug 20 in a torch chamber 28. Torch nozzle 14 is specifically configured with threads 34 to be screwed into a conventional spark plug opening in the engine block (not shown) of an internal combustion engine (not shown). Facets 15 permit a wrench (not shown) to be applied to torch nozzle 14 for tightening or loosening and removing the same.

Torch nozzle 14 includes a constricted passageway orifice or throat 40 between a convergent conical surface 32 which forms the forward end of torch chamber 28 and a divergent conical surface 42 which forms the entrance to the cylinder combustion chamber (not shown). The venturi thus formed is believed to suitably shape the flame propelled from the torch chamber 28.

Spark plug 20 and, more particularly, torch chamber 28 is modified with an air inlet 26. Air from a blower (not shown) is forced into air tube 46 as indicated at 47 and, thereafter, into torch chamber 28 through air inlet 26. Advantageously, a vortex mixing action of fuel with air in torch chamber 28 can be readily achieved by forming air inlet 26 as a tangential entry. Alternatively, inlet 26 can be formed into a side of torch nozzle 14 so as to penetrate convergent surface 32 and thereby suitably supply air to torch chamber 28.

Vaporized fuel is supplied to torch chamber 28 by a fuel vaporizer apparatus 60. The vaporized fuel is introduced into torch chamber 28 through fuel inlet 30. The fuel/air mixture in torch chamber 28 is ignited by a spark across spark gap 22. Electrical energy for the spark is supplied through an electrical lead 48, the supply of electrical energy and subsequent spark-initiated ignition in torch chamber 28 being suitably timed according to conventional techniques.

Fuel for the fuel vaporizer apparatus 60 is supplied as indicated at arrow 51 through a fuel line 50 connected to a nipple 62. Nipple 62 has a throughbore 63 and screws into a coupling 64. Coupling 64 serves as an enlarged housing for a porous plug 66 which is interposed in the fuel flow path through coupling 64. Porous plug 66 is fabricated from a substance such as carbon and has sufficient capillary-like passageways therethrough so as to permit the seepage of fuel at a rate generally proportional to the pressure imposed on fuel 51.

Coupling 64 terminates in an antechamber 65 which is in fluid communication with a diametrally reduced, cylindrical tube 69. Tube 69 connects coupling 64 to a block 80 and includes a throughbore 67 which provides fluid communication between antechamber 65 and a vapor channel 74 in block 80. The entrance to tube 69 is embedded in heat exchange relationship with a coolant channel 68 while the remainder of tube 69 projects from coolant channel 68 as narrow neck 71. Narrow neck 71 assists in at least partially thermally isolating coolant channel 68 from thermal energy transmitted by block 80. In particular, narrow neck 71 presents a relatively small cross section for heat conductance from block 80 while, simultaneously, fuel in throughbore 67 serves to absorb heat energy from the walls of narrow neck 71.

Referring now more particularly to FIGS. 3 and 4, a first preferred cooling embodiment for inhibiting the premature vaporization of fuel in vaporization apparatus 60 is illustrated. Water is the preferred cooling medium and flows through an inlet 52 into coolant channel 68 as indicated at 53 and departs from coolant channel 68 as indicated at 55 through water outlet 54. coolant channel 68 is formed as an elongated channel which surrounds the entrance to tube 69 thereby isolating fuel in coupling 64 from thermal energy emanating from block 80.

Block 80 is configured as a solid block of metal and acts as a heat sink to thereby assure that the fuel passing therethrough is maintained in the vapor phase. Block 80 includes a neck 82 which is adapted to be threaded into mating threads in a raised boss 31 protruding from spark plug 20 to accommodate mounting fuel vaporizer apparatus 60 on spark plug 20. Neck 82 has a gasket 84 around its base which forms a seal between boss 31 and block 80.

Neck 82 surrounds and supports a ceramic plug 78 in a spaced relationship to form therebetween a narrow annular space, annulus 76. Ceramic plug 78 is formed from a ceramic material or other high refractory material to withstand the high temperatures from torch chamber 28 which pass through fuel inlet 30. Vaporized fuel from vapor channel 74 passes through annulus 76 and, thereafter, through inlet 30 into torch chamber 28. Additional vaporized fuel passages are provided by channels 77 (see FIG. 4) surrounding ceramic plug 78. Ceramic plug 78 thereby serves as a diffuser for diffusing vaporized fuel to inlet 30 through annulus 76 and channels 77 (FIG. 4).

Vaporization of fuel in throughbore 67 is attained by a vaporizer pin 70 which is inserted into throughbore 67 from block 80 to conduct thermal energy from block 80. Vaporizer pin 70 is diametrally reduced from the internal walls of throughbore 67 so as to provide an annular space through which the vaporized fuel passes to vapor channel 74. As the fuel is vaporized, it expands considerably and forces vaporized fuel through the vaporizer apparatus 60 into torch chamber 28.

Vaporizer pin 70 passes through a reduced opening in block 80 which forms a seat against which an enlarged head 73 of vaporizer pin 70 which is compressed so as to seal the end of throughbore 67 and provide good thermal contact between block 80 and vaporizer pin 70. A set screw 72 is used to compress head 73 against the seat in block 80.

Referring again to FIGS. 1 and 2, one embodiment for a heat shielding and cooling apparatus is shown in the form of a heat shield 16 and a cooling jacket 12. Heat shield 16 is fabricated from a high thermal conductivity metal such as copper, brass or the like and is formed with a cup-like shape having a rim 36 and an aperture 17 in the center of the base thereof. Threaded section 24 of spark plug 20 is passed through aperture 17 and screwed into threads 44 of torch nozzle 14 thereby clamping heat shield 16 between spark plug 20 and torch nozzle 14. By being clamped securely between spark plug 20 and torch nozzle 14, heat shield 16 is in good thermal contact with the same to conduct heat energy therefrom outwardly to rim 36. From rim 36 the heat is transmitted to a skirt 38 of cooling jacket 12.

Cooling jacket 12 and, more particularly, the circumferentially extending skirt 38 is configured so as to telescopically receive rim 36 in snug press-fit relationship to (1) support cooling jacket 12 on heat shield 16 and (2) provide good thermal contact between rim 36 and skirt 38. Cooling jacket 12 includes a coolant channel 18 formed as a cylindrical annulus through which cooling water from an inlet tube 56 is introduced as indicated at arrow 57. A baffle 19 (shown in broken lines, FIG. 2) directs the cooling water downwardly adjacent skirt 38 as indicated at arrow 61 (shown in broken lines, FIG. 2) so as to increase the turbulence and the rate of heat absorption from skirt 38. The warm water departs from annular cooling channel 18 through an outlet 58 as indicated at 59. Water for cooling the various components in the ignition apparatus of this invention may be supplied from a cooling coil (not shown) inserted in the air conditioning system (not shown) or from any other suitable cooling source.

Figure 5:
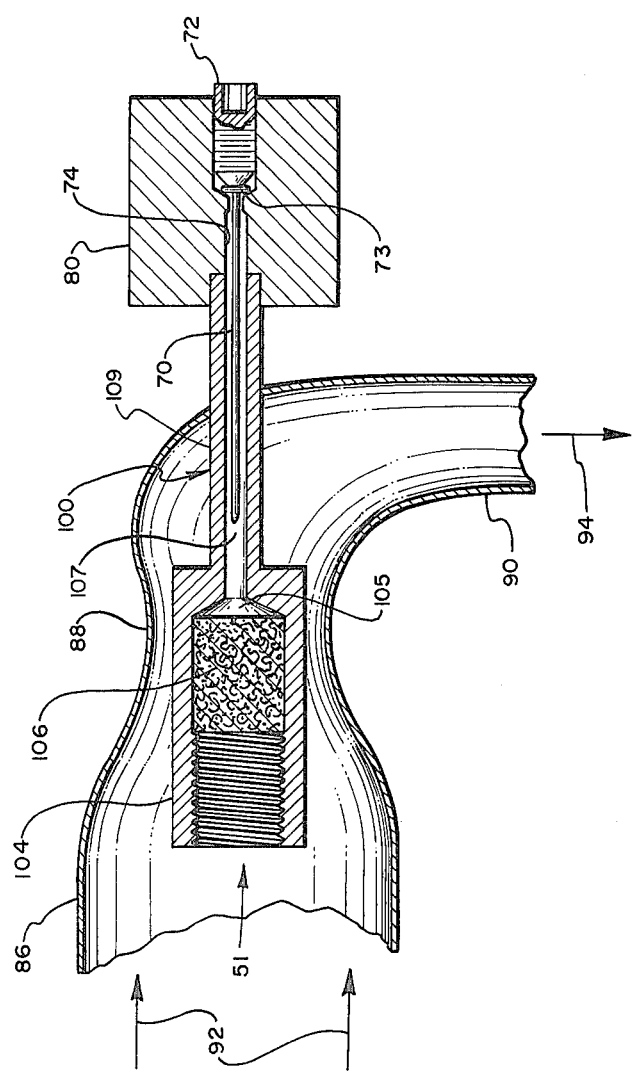
FIG. 5 is a cross section of a second preferred shielding and cooling embodiment for the fuel vaporization system of this invention.

Referring now more particularly to FIG. 5, a second preferred embodiment for a fuel vaporizer apparatus of this invention including a heat shielding and cooling means is shown. In particular, a fuel vaporizer apparatus 100 includes a fuel line coupling 104 which serves as a housing for a porous plug 106 through which the fuel seeps into an antechamber 105. The fuel then passes into a cylindrical throughbore 107 passing through a tube 109. Porous plug 106 is similar to porous plug 66 (FIGS. 2 and 3) while cylindrical throughbore 107 and tube 109 are similar to throughbore 67 and tube 69, respectively (FIGS. 2-4).

Fuel vaporizer apparatus 100 is partially inserted into an air stream tube 86. Air stream tube 86 receives a continuous flow of air from a conventional blower (not shown) and includes a venturi 88 in the vicinity of antechamber 105. Air stream tube 86 is configured as a coaxial tube about coupling 104 and accommodates a stream of cooling air, indicated as arrows 92, therethrough. The air stream is accelerated through venturi 88 and expands upon exiting therefrom so as to be cooled and thereby serve to absorb thermal energy from coupling 104, porous plug 106 and the fuel therein. Additionally, venturi 88 forces the air stream into a constricted stream of air which is also accelerated over the surface of coupling 104 so as to more rapidly remove thermal energy from the surface of coupling 104.

The warm air exiting from air blast tube 86 is directed from a nozzle 90 away from spark splug apparatus 20 (FIG. 2) as a stream of warm air as indicated at 94. Air stream tube 86 acts as a heat shield about fuel line 50 by being formed as a coaxial tube about fuel inlet line 50 (FIGS. 1 and 2). It is, therefore, believed unnecessary to provide the vaporizer apparatus 100 with heat shield 16 and cooling jacket 12 thereby greatly simplifying the structure.

The remainder of vaporizer apparatus 100 including vaporizer pin 70, block 80, vapor channel 74, and set screw 72 and vaporizer pin head 73 are similar to that set forth with respect to the embodiment of FIGS. 2-4 and, accordingly, the same numbering designation is used for illustrating the various parts of the structure. It is, therefore, specifically understood that vaporizer apparatus 100 is attached to spark plug 20 by the same type of structure set forth in FIGS. 2-4.

The Method

In practicing the method of this invention, a spark plug 20 is modified by enclosing spark gap 22 in a torch chamber 28 into which an air inlet 26 and a vaporized fuel inlet 30 are provided. Spark gap 22 is enclosed by a torch nozzle 14 which is, in turn, secured by threads 44 in the conventional spark plug opening (not shown) in the internal combustion engine (not shown).

Where appropriate, vaporizer apparatus 60 or 100 and, more particularly, the liquid fuel entering therein, is suitably shielded and/or cooled so as to inhibit the premature vaporization of fuel. As the fuel passes into the appropriate vaporizer apparatus 60 or 100 downstream of porous plug 66 or 106, respectively, it is suitably vaporized by heat from vaporizer pin 70. The vaporized fuel is then diffused through fuel inlet 30 where it is combined with air from air inlet 26 to provide a richer, combustible fuel/air mixture in torch chamber 28. This fuel/air mixture in torch chamber 28 is periodically ignited by a spark across spark gap 22. The resulting rapid combustion of the fuel/air mixture creates an explosion which propels a jet of burning fuel through orifice 40 where it is dispersed throughout the lean fuel/air mixture in the combustion chamber (not shown) in the internal combustion engine (not shown). The relatively lean fuel/air mixture in the combustion chamber is obtained by suitably readjusting the carburetion system (not shown) and may also be augmented by injecting an additional volume of air directly into the combustion chamber.

The ignition in torch chamber 28 tends to be selfextinguishing against continued burning when there is no spark at spark gap 22. The momentary back pressure at both air inlet 26 and fuel inlet 30 momentarily stops the inflow of air and fuel thereby acting as a check valve to both components. Release of the back pressure allows the fuel and air to again enter and mix within torch chamber 28 through fuel inlet 30 and air inlet 26, respectively.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a United States Letters Patent is:

1. An ignition apparatus for a cylinder of an internal combustion engine comprising:
   a torch nozzle removably attached to a spark plug thereby enclosing a spark gap of the spark plug in a torch chamber, the torch nozzle being adapted to be screwed into the conventional spark plug opening in an engine block and thereby providing fluid communication between the torch chamber and the cylinder; and
   means for introducing fuel and air into the torch chamber comprising:
      a fuel supply source of pressurized fuel;
      valving means in the fuel supply source upstream from the torch chamber and a means for diffusing the vaporized fuel into the torch chamber, the valving means comprising a porous plug in the fuel supply source, the porous plug restricting fuel flow to seepage action thereby opposing reverse flow action from higher vapor pressures downstream from the porous plug, the seepage rate being generally proportional to the pressure imposed on the fuel;
      means for inhibiting vaporization of the fuel upstream of the valving means;
      vaporizing means downstream of the valving means for vaporizing the fuel; and
      means for diffusing the vaporized fuel into the torch chamber.

2. An ignition apparatus as defined in claim 1 wherein the communication between the torch chamber and the cylinder comprises a constricted orifice which inhibits flashback into the torch chamber by the burning of fuel in the cylinder.

3. An ignition apparatus as defined in claim 1 wherein the means for inhibiting vaporization comprises a first channel for a coolant fluid in heat exchange relationship with the valving means.

4. An ignition apparatus as defined in claim 1 wherein the fuel supply source, valving means, means for inhibiting vaporization fuel, vaporizing means, and means for diffusing vaporized fuel apparatus of the ignition apparatus is surrounded by a coolant jacket and heat shield means to isolate said fuel apparatus from the torch nozzle and from heat radiated from the internal combustion engine, the coolant jacket comprising a cylindrical wall and a second coolant channel integral with the wall, the second coolant channel having an inlet and an outlet for a coolant fluid, the heat shield means comprising a cup-like member fabricated from a high thermal conductivity material and adapted to be clamped between the torch nozzle and the spark plug and to engage the coolant jacket to thereby conduct heat from the torch nozzle to the coolant jacket thereby isolating said fuel apparatus from said heat.

5. An ignition apparatus for a cylinder of an internal combustion engine comprising:
   a torch nozzle removably attached to a spark plug thereby enclosing a spark gap of the spark plug in a torch chamber, the torch nozzle providing fluid communication between the torch chamber and the cylinder; and
   means for introducing fuel and air into the torch chamber comprising:
      a fuel supply source of pressurized fuel;
      valving means in the fuel supply source;
      means for inhibiting vaporization of the fuel upstream of the valving means;
      vaporizing means downstream of the valving means for vaporizing the fuel, the vaporizing means comprising heat transmitting means for directing heat to the fuel, the heat transmitting means comprising a high thermal conductivity metal pin which is interposed in the fuel line and the heat is transmitted by conduction through the high thermal conductivity metal pin; and
      means for diffusing the vaporized fuel into the torch chamber.

6. An ignition apparatus for a cylinder of an internal combustion engine comprising;
   a torch nozzle removably attached to a spark plug thereby enclosing a spark gap of the spark plug in a torch chamber, the torch nozzle providing fluid communication between the torch chamber and the cylinder; and
   means for introducing fuel and air into the torch chamber comprising:
      a fuel supply source of pressurized fuel;
      valving means in the fuel supply source;
      means for inhibiting vaporization of the fuel upstream of the valving means;
      vaporizing means downstream of the valving means for vaporizing the fuel; and
      means for diffusing the vaporized fuel into the torch chamber comprising a constricted annular space formed around a ceramic plug and through which the vaporized fuel is allowed to pass into the combustion chamber.

7. An ignition apparatus for an internal combustion engine comprising:
   a torch chamber removably mounted in the conventional spark plug opening of a cylinder of the internal combustion engine to thereby be in fluid communication with the cylinder;
   means for supplying fuel to the torch chamber comprising:
      a fuel inlet line;
      a porous plug interposed in the fuel inlet line upstream of the torch chamber;
      cooling means for inhibiting vaporization of fuel upstream from the porous plug;
      vaporizer means for vaporizing the fuel after it passes through the porous plug; and
      an inlet for directing the vaporized fuel into the torch chamber; means for supplying oxygen for the fuel; and spark means for initiating combustion of the fuel/air mixture in the torch chamber.

8. An ignition apparatus as defined in claim 7 wherein the cooling means comprises a cooling water flow path in heat exchange relationship with the fuel inlet line in the vicinity of the porous plug.

9. An ignition apparatus as defined in claim 7 wherein the vaporizer means comprises means for introducing heat into the fuel to vaporize the fuel comprising a vaporizer pin inserted in the fuel inlet line to conduct heat to the fuel.

10. An ignition apparatus for an internal combustion engine comprising:
   a torch chamber removably mounted in fluid communication with a cylinder of the internal combustion engine;
   means for supplying fuel to the torch chamber comprising:
      a fuel inlet line;

a porous plug interposed in the fuel inlet line;

cooling means for inhibiting vaporization of fuel upstream from the porous plug comprising a cooling air flow line coaxial with the fuel inlet line, the cooling air flow line having a venturi adjacent the porous plug;

vaporizer means for vaporizing the fuel after it passes through the porous plug;

an inlet for directing the vaporized fuel into the torch chamber; means for supplying oxygen for the fuel; and spark means for initiating combustion of the fuel/air mixture in the torch chamber.

11. A method for igniting a first fuel/air mixture in the combustion zone in a cylinder of an internal combustion engine with a flame from a second fuel/air mixture, the first fuel/air mixture having a lower fuel ratio than the second fuel/air mixture comprising the steps of:

enclosing the spark gap end of a spark plug in a torch chamber, the torch chamber having an outlet communicating between the torch chamber and the combustion zone, the torch chamber having a first inlet for introducing vaporized fuel into the torch chamber and a second inlet for introducing air into the torch chamber;

inserting a porous plug in the fuel inlet line and forcing liquid fuel through a porous plug, the porous plug acting as a valving means against periodic elevated pressures in the torch chamber;

inserting a vaporizer pin in the fuel inlet line downstream from the porous plug to conduct heat into the fuel thereby vaporizing the fuel downstream of the porous plug;

interposing a ceramic plug in the first inlet, the ceramic plug providing an annular space surrounding the ceramic plug thereby diffusing the vaporized fuel into the torch chamber through the first inlet;

mixing the vaporized fuel with air from the second inlet to form a second fuel/air mixture in the torch chamber; and igniting the second fuel/air mixture in the torch chamber by creating an electrical spark at the spark gap and ejecting the burning fuel through the outlet into the combustion zone thereby igniting the first fuel/air mixture in the combustion zone.

12. The method of claim 11 wherein the forcing step includes inhibiting fuel in the porous plug and fuel upstream of the porous plug against premature vaporization by preventing excessive absorption of heat by said fuel, said inhibiting step comprising surrounding the fuel system with a cooling apparatus comprising a cylindrical coolant jacket and interposing a heat shield between the torch chamber and the fuel system, the coolant jacket being adapted to be surmounted upon the heat shield.

13. An ignition apparatus for an internal combustion engine comprising in combination at least one cylinder and a combustion chamber in the cylinder and means for delivering a first fuel/air mixture to the combustion chamber, said ignition apparatus comprising:

a torch chamber having a first inlet, a second inlet and an outlet, the outlet comprising a constricted orifice for providing fluid communication between the torch chamber and the combustion chamber, the first inlet providing an entry for vaporized fuel into the torch chamber and the second inlet providing an entry for air into the torch chamber;

means for introducing vaporized fuel through the first inlet into the torch chamber to form a second fuel/air mixture in the torch chamber, the second fuel/air mixture having a richer fuel ratio than the first fuel/air mixture, comprising:

a fuel feed line for feeding pressurized fuel to the ignition apparatus;

a porous plug in the fuel feed line for passing fuel through minute passageways which inhibit reverse flow from periodic elevated pressures in the torch chamber;

vaporizing means comprising a vaporizer pin inserted into the fuel feed line, the vaporizer pin conducting heat to the fuel thereby vaporizing the fuel after it passes through the porous plug; and means for inhibiting premature vaporization of fuel upstream of the porous plug;

means for mixing air with the vaporized fuel in the torch chamber; and spark means for initiating combustion of the second fuel/air mixture in the torch chamber to create a jet of flame which is propelled into the combustion chamber of the internal combustion engine to initiate combustion of the first fuel/air mixture in the combustion chamber.

14. An ignition apparatus comprising:

a torch nozzle adapted to be removably mounted in a spark plug opening to a combustion chamber in a cylinder of an internal combustion engine, the torch nozzle including means for removably mounting a spark plug to the torch nozzle and means for enclosing a spark gap of the spark plug in a torch chamber, the torch nozzle having a verturi for providing fluid communication between the torch chamber and the combustion chamber;

means for introducing a vaporized fuel into the torch chamber comprising:

a fuel line for fuel under pressure;

a valve means in the fuel line comprising a porous plug through which liquid fuel is forced to seep by the pressure;

means for inhibiting premature vaporization of fuel upstream of the valve means comprising a heat shield means and a fluid channel adjacent the valve means, the fluid channel conducting a cooling fluid therethrough to absorb heat from the valve means;

means for vaporizing the fuel after it passes through the porous plug comprising means for conducting heat energy to the fuel; and a fuel inlet into the torch chamber for passing vaporized fuel into the torch chamber;

means for mixing air with the vaporized fuel in the torch chamber comprising an air inlet to the torch chamber and an air line conducting pressurized air to the air inlet, the air inlet being formed as a tangential opening into the torch chamber to develop a vortex with the air to thereby mix the fuel with the air; and means for producing a spark across the spark gap to initiate combustion of the fuel and air mixture in the torch chamber so as to propel a flame through the venturi into the combustion chamber.

* * * * *